United States Patent
Katou

(10) Patent No.: US 7,352,276 B2
(45) Date of Patent: Apr. 1, 2008

(54) CASING STRUCTURE OF TRANSMITTER OF TIRE CONDITION MONITORING APPARATUS

(75) Inventor: Michiya Katou, Ichinomiya (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 645 days.

(21) Appl. No.: 10/926,473

(22) Filed: Aug. 26, 2004

(65) Prior Publication Data

US 2005/0046556 A1    Mar. 3, 2005

(30) Foreign Application Priority Data

Aug. 27, 2003  (JP)  ............... 2003-303505

(51) Int. Cl.
*B60C 23/00* (2006.01)
(52) U.S. Cl. .................. 340/445; 73/146.2; 73/146.3
(58) Field of Classification Search ................ 340/442, 340/445–448; 73/146.2, 146.3, 146.8
See application file for complete search history.

(56) References Cited

U.S. PATENT DOCUMENTS 6,732,590 B1 * 5/2004 Gottlieb et al. ............... 73/754
6,750,761 B1 * 6/2004 Newman .................... 340/447
2003/0000297 A1 * 1/2003 Ito et al. ...................... 73/146

FOREIGN PATENT DOCUMENTS

| EP | 1 270 277 A2 | 1/2003 |
| JP | 11 321256 A | 11/1999 |
| JP | 2000 052726 A | 2/2000 |
| JP | 2003-112506 | 4/2003 |

* cited by examiner

Primary Examiner—Thomas Mullen
(74) Attorney, Agent, or Firm—Patterson, Thuente, Skaar & Christensen, P.A.

(57) ABSTRACT

A transmitter in an apparatus for monitoring a condition of a tire of a vehicle includes a circuit portion and a casing that accommodates the circuit portion. The casing has a first pressure transmitting portion that transmits the pressure in the tire to the circuit portion so that the circuit portion can detect the pressure in the tire. The pressure transmitted to the circuit portion through the first pressure transmitting portion produces force that presses the circuit portion. The casing further has a second pressure transmitting portion that transmits the pressure in the tire to the circuit portion to apply force that acts against the pressing force to the circuit portion. Therefore, the transmitter prevents a substrate from flexing.

10 Claims, 3 Drawing Sheets

CASING STRUCTURE OF TRANSMITTER OF TIRE CONDITION MONITORING APPARATUS

BACKGROUND OF THE INVENTION

The present invention relates to casing structure of a transmitter of a tire condition monitoring apparatus. More particularly, the present invention pertains to casing structure of a transmitter for a wireless tire condition monitoring apparatus that permits a driver in a vehicle passenger compartment to check conditions of tires, such as the air pressure.

Wireless tire condition monitoring apparatuses that allow a driver in a vehicle passenger compartment to check the conditions of vehicle tires have been proposed. The apparatus of the publication includes transmitters and a receiver. Each transmitter is located in the wheel of one of the tires and the receiver is located in the body frame of the vehicle. Each transmitter detects the conditions, such as air pressure and the temperature of the associated tire, and wirelessly transmits the detected information. The receiver receives data wirelessly transmitted by the transmitters with an antenna and displays the conditions of the tires, for example, on a display located in front of the driver's seat.

Each transmitter is formed by electronic elements such as a pressure sensor and a transmission antenna, which are mounted on a substrate. The substrate on which the electronic elements are mounted is accommodated in a casing. The casing is filled with, for example, silicon potting material except around a diaphragm of the pressure sensor to maintain the environment resistance such as the moisture resistance and the water resistance of the transmitter. As a result, a first surface (the upper portion) and an opposite second surface (the lower portion) of the substrate are covered with potting material except around the diaphragm of the pressure sensor. A lid that covers the opening of the casing has a vent hole for permitting the pressure sensor to measure the air pressure in the associated tire. Therefore, the air pressure in each tire and the air pressure in the corresponding casing are maintained to be the same (see Japanese Laid-Open Patent Publication No. 2003-112506).

However, the second surface of the substrate is covered with potting material. The potting material is covered with incompressible casing. That is, the space between the second surface of the substrate and the casing is filled with potting material. As a result, when the tire is inflated, the air pressure is applied to the incompressible casing and is hardly applied to the potting material on the second surface of the substrate. On the other hand, the first surface of the substrate is covered with potting material except around the diaphragm of the pressure sensor. As a result, when the tire is inflated, the air pressure is applied to the potting material on the substrate via the vent hole.

Since the potting material is compressible, the potting material is elastically deformed when receiving the air pressure. That is, the air pressure is reduced by the compressible potting material. In other words, the air pressure is reduced by the potting material.

The periphery of the substrate is secured by a boss integrally formed with the casing. Therefore, the air pressure applied to the substrate via the potting material differs from the air pressure applied to the substrate via the pressure sensor, which causes the center of the substrate to flex downward. As a result, stress is applied to the electronic elements located at the flexed portion of the substrate. Thus, the substrate may be formed thicker taking into consideration of the air pressure in the tire. However, when the substrate is formed thicker, the weight of the transmitter is slightly increased. Although the weight increase of the transmitter is slight, the centrifugal force caused by the rotation of the tire is increased in proportion to the weight. Therefore, increasing the thickness of the substrate is undesirable. Furthermore, increasing the thickness of the substrate conflicts with the purpose of reducing the size of the casing, which accommodates the transmitter.

SUMMARY OF THE INVENTION

Accordingly, it is an objective of the present invention to provide a casing structure of a transmitter of a tire condition monitoring apparatus that prevents a substrate from flexing.

To achieve the above-mentioned objective, the present invention provides a transmitter in an apparatus for monitoring a condition of a tire of a vehicle. The transmitter includes a circuit portion that detects pressure of the tire and generates a transmission signal that contains data representing the detected pressure of the tire, and a casing that accommodates the circuit portion. The casing has a first pressure transmitting portion that transmits the pressure in the tire to the circuit portion so that the circuit portion can detect the pressure in the tire. The pressure transmitted to the circuit portion through the first pressure transmitting portion produces force that presses the circuit portion. The casing further has a second pressure transmitting portion that transmits the pressure in the tire to the circuit portion to apply force that acts against the pressing force to the circuit portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(*b*) is a cross-sectional view of the transmitter shown in FIG. 3(*a*) taken along line A-A in FIG. 3(*a*);

FIG. 4(*b*) is a cross-sectional view of the transmitter shown in FIG. 4(*a*) taken along line A-A in FIG. 4(*a*).

DETAILED DESCRIPTION OF THE PREFERRED EMBODIMENTS

A tire condition monitoring apparatus according to one embodiment will now be described with reference to the drawings. The apparatus is used in a vehicle such as an automobile.

Figure 1:
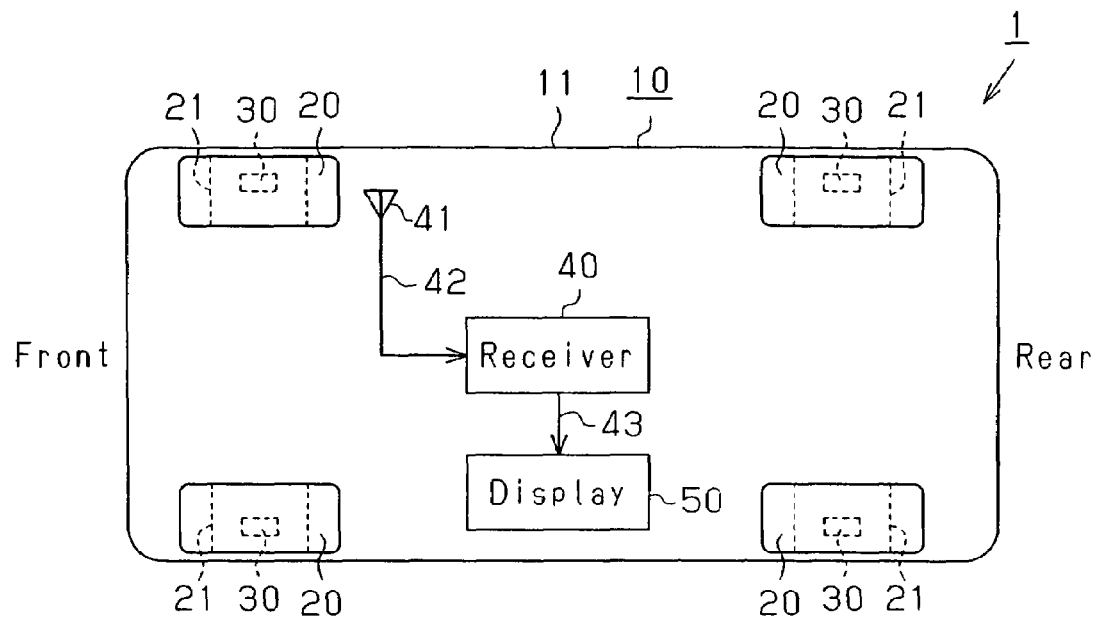
FIG. 1 is a block diagram showing a tire condition monitoring apparatus according to the present invention.

As shown in FIG. 1, the tire condition monitoring apparatus 1 includes four transmitters 30 and a single receiver 40. Each of the transmitters 30 is associated with a different one of four tires 20 of a vehicle 10. The receiver 40 is installed in a body frame 11 of the vehicle 10.

Each transmitter 30 is fixed to a wheel 21 such that the transmitter 30 is located in the associated tire 20. Each transmitter 30 measures the condition of the corresponding tire 20, that is, the pressure of the tire 20. The transmitter 30 then wirelessly transmits data containing air pressure data.

The receiver 40 is located at a predetermined position on the body frame 11 and is activated by electricity of a battery (not shown) of the vehicle 10. The receiver 40 is connected to a reception antenna 41 with a cable 42. The receiver 40 receives data transmitted by the transmitters 30 through the reception antenna 41.

A display 50 is located in the view of the driver of the vehicle 10, for example, in the passenger compartment. The display 50 is connected to the receiver 40 with a cable 43.

Figure 2:
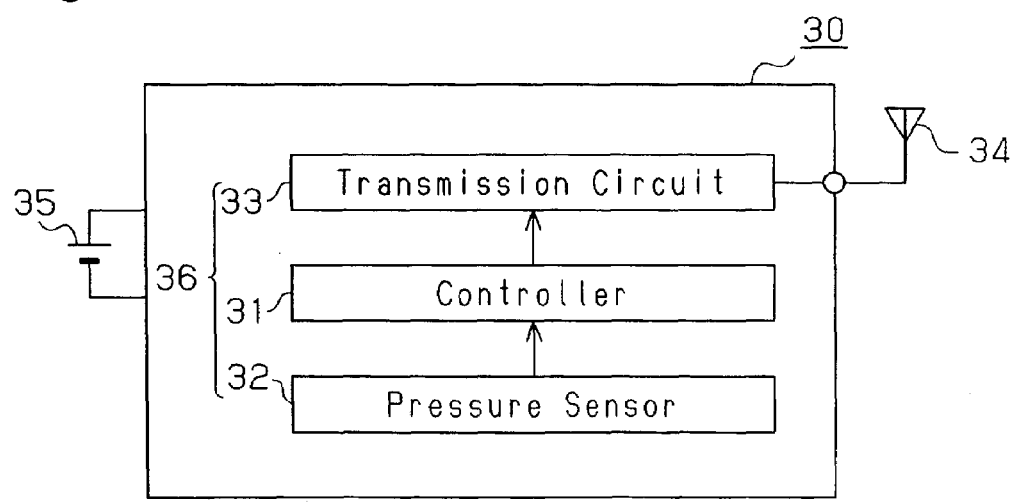
FIG. 2 is a block diagram showing a transmitter incorporated in the apparatus shown in FIG. 1.

As shown in FIG. 2, each transmitter 30 includes a circuit portion 36 that detects the condition of the corresponding tire 20 and generates a transmission signal that contains data representing the detected condition of the tire 20. The circuit portion 36 includes a controller 31, a pressure sensor 32, and a transmission circuit 33. The controller 31 is a microcomputer. The controller 31 includes, for example, a central processing unit (CPU), a read only memory (ROM), and a random access memory (RAM). A unique ID code is registered in an internal memory, for example, the ROM, of the controller 31. The ID code is used to distinguish the associated transmitter 30 from the other three transmitters 30.

The tire pressure sensor 32 measures the air pressure in the interior of the associated tire 20 and provides the controller 31 with pressure data, which is obtained from the measurement. The controller 31 supplies a transmission circuit 33 with data including a signal indicating the received air pressure data and the specific ID code registered in the internal memory. The transmission circuit 33 encodes and modulates the data sent from the controller 31. The transmission circuit 33 then wirelessly transmits the data through a transmission antenna 34. Each transmitter 30 is provided with a battery 35. The transmitter 30 is driven by electricity of the battery 35.

Figure 3A:
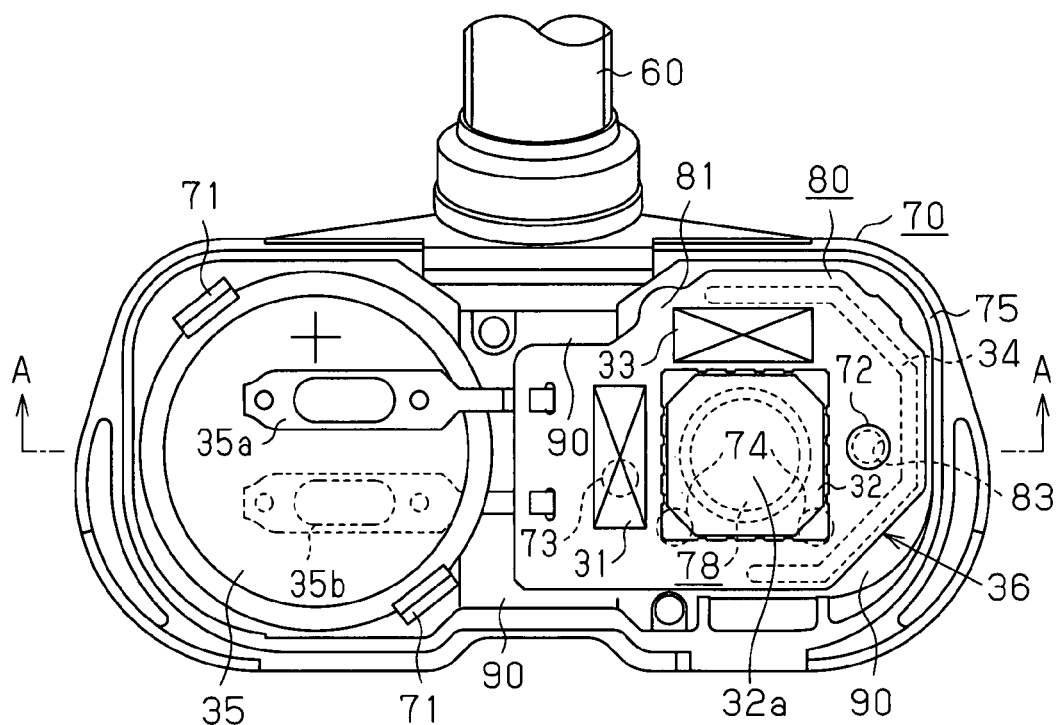
FIG. 3(*a*) is an explanatory diagram illustrating the structure of the transmitter shown in FIG. 2.
Figure 3B:
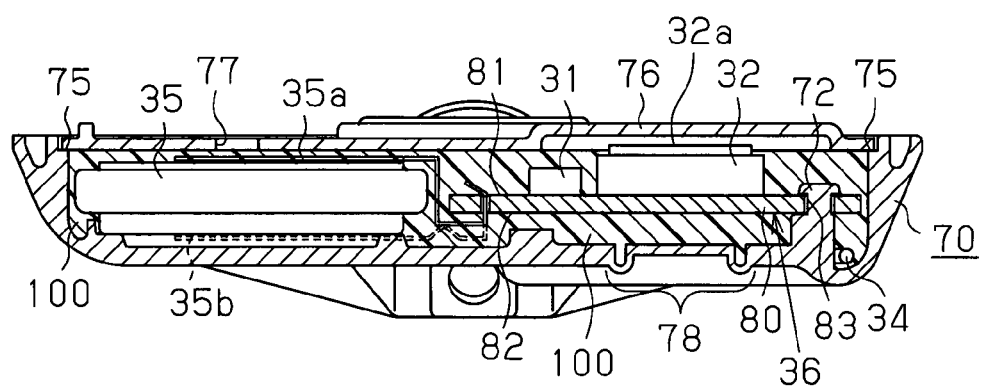

As shown in FIGS. 3(*a*) and 3(*b*), a casing 70 is located below a valve stem 60. The battery 35 is accommodated in a left section of the casing 70. A pair of engaging hooks 71 are integrally formed with the left portion of the casing 70 and the hooks 71 lock the battery 35. A positive terminal 35*a* of the battery 35 is folded and is connected to the substrate 80. A negative terminal 35*b* of the battery 35 is also folded and is connected to the substrate 80.

On the other hand, the circuit portion 36 is accommodated in a right section of the casing 70. The circuit portion 36 includes the substrate 80 and electronic elements mounted on the substrate 80. That is, electronic elements such as the controller 31, the pressure sensor 32, the transmission circuit 33, and the transmission antenna 34 are mounted on the substrate 80. The substrate 80 has a first surface 81 (upper portion) and a second surface 82 (lower portion), which is opposite to the first surface 81. Electronic elements such as the controller 31, the pressure sensor 32, and the transmission circuit 33 are located on the first surface 81. The transmission antenna 34 is located on the second surface 82.

A securing boss 72, a substrate supporting boss 73, and two sensor supporting bosses 74 are located on a portion of the casing 70 that faces the second surface 82. The bosses, 72, 73, 74 protrude toward the second surface 82. The securing boss 72 secures the substrate 80 to the casing 70. The substrate supporting boss 73 supports the substrate 80. The sensor supporting bosses 74 support the substrate 80 and the pressure sensor 32 via the substrate 80. That is, the casing has the bosses 73, 74 that can contact the second surface 82. The securing boss 72, the substrate supporting boss 73, and the sensor supporting bosses 74 are integrally formed with the casing 70.

The securing boss 72 is inserted in a mounting hole 83 formed through the substrate 80. Then, the distal end of the securing boss 72 is subjected to heat crimping. As a result, the substrate 80 is secured to the casing 70 by the single securing boss 72.

The securing boss 72, the substrate supporting boss 73, and the sensor supporting bosses 74 are located at a middle position between the center of the substrate 80 and the contour of the substrate 80. Therefore, for example, when potting material 100 is injected to the space on the second surface 82 of the substrate 80 from a gap 90 between the casing 70 and the substrate 80, the securing boss 72 and the substrate supporting boss 73 do not restrict the flow of the potting material 100. Therefore, the time required for charging the potting material 100 is reduced.

After filling the space on the second surface 82 with the potting material 100, the interior of the casing 70 except a pressure sensing portion 32*a* (a diaphragm) on the upper surface of the pressure sensor 32 for measuring the air pressure is filled with the potting material 100. That is, the circuit portion 36 is covered with the potting material 100 except for the part corresponding to the pressure sensing portion 32*a*. Therefore, the environment resistance such as the moisture resistance and the water resistance of the electronic elements, which constitute the transmitter 30, is maintained. This prevents the occurrence of abnormalities, such as malfunctioning of the transmitter 30.

The sensor supporting bosses 74 are located in the vicinity of the pressure sensor 32 via the substrate 80. More specifically, the sensor supporting bosses 74 are located directly below the pressure sensor 32 via the substrate 80. That is, the sensor supporting bosses 74 support the pressure sensor 32 via the substrate 80 while supporting the substrate 80.

An opening 75 of the casing 70 is closed by a lid 76. The lid 76 has a vent hole 77 to permit the pressure sensor 32 to measure the air pressure in the tire 20. That is, the casing 70 has the vent hole 77 functioning as a first pressure transmitting portion. The vent hole 77, or the first pressure transmitting portion, transmits the pressure in the tire 20 to the pressure sensor 32, thereby permitting the pressure sensor 32 to measure the air pressure in the tire 20. In the right section of the casing 70, a portion of the casing 70 that corresponds to the central portion of the second surface 82 of the substrate 80 has a thin portion 78 (a bellows), which is thinner than the remainder of the casing 70.

This embodiment provides the following advantages.

(1) When the tire 20 is inflated, the air pressure is applied to the potting material 100 on the substrate 80 via the vent hole 77. Therefore, pressure is applied to the substrate 80 and the electronic elements mounted on the substrate 80 via the potting material 100. That is, the pressure that is applied to the circuit portion 36 through the vent hole 77 functioning as the first pressure transmitting portion produces force that presses the first surfaces 81 of the substrate 80.

However, in the right section of the casing 70, a portion of the casing 70 that corresponds to the central portion of the second surface 82 of the substrate 80 has a thin portion 78, which is thinner than the remainder of the casing 70. That is, part of the casing 70 is formed to be deformable by the pressure in the tire 20. Therefore, the air pressure in the tire 20 is also applied to and deforms the thin portion 78. Thus, the air pressure in the tire 20 presses the potting material 100 located below the second surface 82 of the substrate 80 via the deformed thin portion 78.

As a result, a portion of the second surface 82 that corresponds to the pressure sensor 32 receives the pressure in the tire 20. That is, the thin portion 78 functions as a second pressure transmitting portion. The thin portion 78, or the second pressure transmitting portion, applies the pressure in the tire 20 to a portion of the second surface 82 that corresponds to the pressure sensor 32, thereby producing force that presses the second surface 82 against the force that is based on the pressure in the tire 20 and acts on the first surface 81 through the vent hole 77. This prevents the substrate 80 from being flexed even if the tire 20 is inflated. Thus, the electronic elements on the substrate 80 are prevented from receiving any stress.

(2) The pressure sensor 32 is the heaviest among the electronic elements constituting the transmitter 30. Therefore, the greatest centrifugal force is applied to the pressure sensor 32 by the rotation of the associated tire 20. The sensor supporting bosses 74 support the pressure sensor 32 via the substrate 80 while supporting the substrate 80. Therefore, although the centrifugal force is applied to the pressure sensor 32 by the rotation of the associated tire 20, the substrate 80 does not flex. Thus, stress is not applied to the electronic elements on the substrate 80, or particularly, on the pressure sensor 32.

The invention may be embodied in the following forms.

Figure 4A:
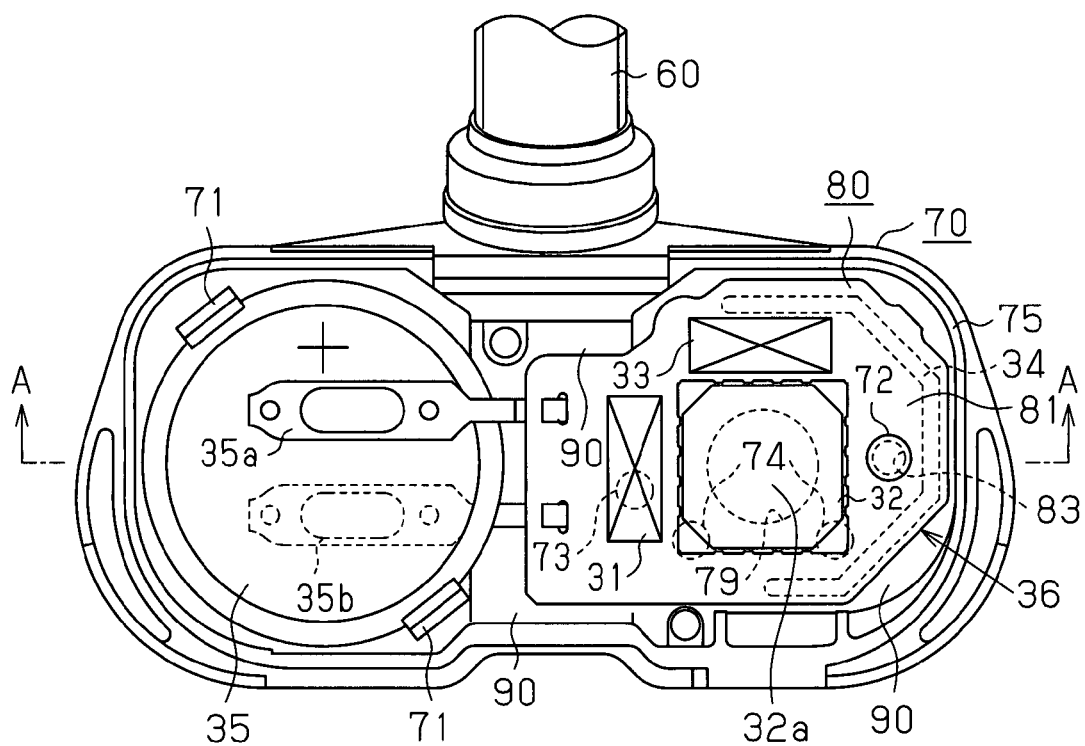
FIG. 4(*a*) is an explanatory diagram showing the structure of a transmitter according to another embodiment of the present invention.
Figure 4B:
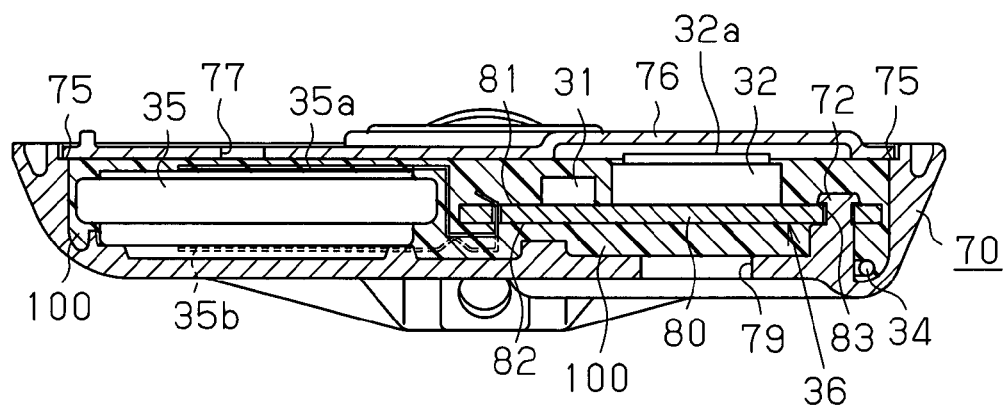

In the above illustrated embodiment, the second pressure transmitting portion comprises the thin portion 78, which is formed in a part of the casing 70 that faces the central portion of the second surface 82 of the substrate 80. Instead, as shown in FIGS. 4(*a*) and 4(*b*), the second pressure transmitting portion may comprise a through hole 79 at the same location to connect the interior of the casing 70 with the outside. In this case, when charging the potting material 100, the communication hole 79 needs to be closed until the potting material 100 solidifies to prevent the potting material 100 from flowing out from the communication hole 79.

With this structure also, the air pressure of the tire 20 is applied to the potting material 100 via the communication hole 79. As a result, the same air pressure is applied to the potting material 100 located on the first surface 81 of the substrate 80 and the potting material 100 located on the second surface 82 of the substrate 80. This prevents the substrate 80 from flexing even when the tire 20 is inflated. Thus, the electronic elements on the substrate 80 do not receive any stress.

The preferred embodiment may be applied in a case in which the environment resistance such as the moisture resistance and the water resistance of the transmitter 30 is maintained by, for example, a heat contraction tube or surface coating material instead of the potting material 100.

Also, in a case where the environment resistance such as the moisture resistance and the water resistance of the transmitter 30 can be maintained by the structure of the casing 70, the potting material 100 need not be charged into the casing 70.

A temperature sensor, which functions as a measuring device, may be provided on the transmitter 30 to wirelessly transmit air pressure data and internal temperature data of the tire 20 from the transmitter 30 as data representing the tire condition.

Other than four-wheeled vehicles, the present invention may be applied to two-wheeled vehicles, such as bicycles and motor cycles, multi-wheeled busses, multi-wheeled trailers and industrial vehicles, such as forklifts. When the present invention is applied to a trailer, the receiver 40 and the display 50 are provided in the tractor.

In addition, the number of the receiver 40 need not be one.

The invention claimed is:

1. A transmitter in an apparatus for monitoring a condition of a tire of a vehicle, the transmitter comprising:
a circuit portion that detects pressure of the tire and generates a transmission signal that contains data representing the detected pressure of the tire; and
a casing that accommodates the circuit portion, wherein the casing has a first pressure transmitting portion that transmits the pressure in the tire to the circuit portion so that the circuit portion can detect the pressure in the tire, wherein the pressure transmitted to the circuit portion through the first pressure transmitting portion produces force that presses the circuit portion, and wherein the casing further has a second pressure transmitting portion that transmits the pressure in the tire to the circuit portion to apply force that acts against the pressing force to the circuit portion.

2. The transmitter according to claim 1, wherein the circuit portion includes a substrate and an electronic element mounted on the substrate, the substrate having a first surface and a second surface opposite to the first surface, wherein the first pressure transmitting portion transmits the pressure in the tire to the circuit portion, thereby producing force that presses the first surface, and wherein the second pressure transmitting portion transmits the pressure in the tire to the circuit portion, thereby producing force that presses the second surface.

3. The transmitter according to claim 2, wherein the electronic element includes a pressure sensor mounted on the first surface, and wherein the first pressure transmitting portion transmits the pressure in the tire to the pressure sensor, and the second pressure transmitting portion transmits the pressure in the tire to a section of the second surface that corresponds to the pressure sensor.

4. The transmitter according to claim 3, wherein the pressure sensor has a pressure sensing portion, and wherein the circuit portion is covered with a potting material except for the pressure sensing portion.

5. The transmitter according to claim 2, wherein the casing has a boss that can contact the second surface.

6. The transmitter according to claim 1, wherein the first pressure transmitting portion has a vent hole formed in the casing.

7. The transmitter according to claim 1, wherein the second pressure transmitting portion is provided by making a part of the casing deformable by the pressure in the tire.

8. The transmitter according to claim 7, wherein the second pressure transmitting portion is a thin portion provided by making a part of the casing thinner than the remainder of the casing.

9. The transmitter according to claim 1, wherein the second pressure transmitting portion has a through hole for connecting the interior of the casing with the outside.

10. A transmitter in an apparatus for monitoring a condition of a tire of a vehicle, the transmitter comprising:
a circuit portion that detects pressure of the tire and generates a transmission signal that contains data representing the detected pressure of the tire, wherein the circuit portion includes a substrate and a pressure sensor mounted on the substrate, the substrate having a first surface and a second surface opposite to the first surface, the pressure sensor being located on the first surface, the pressure sensor having a pressure sensing portion, and wherein the circuit portion is covered with a potting material except for the pressure sensing portion; and a casing that accommodates the circuit portion, wherein the casing has a first pressure transmitting portion and a second pressure transmitting portion, the first pressure transmitting portion transmits the pressure in the tire to the pressure sensing portion, and the second pressure transmitting portion transmits the pressure in the tire to a section of the second surface that corresponds to the pressure sensor.

* * * * *